US012639782B2

(12) United States Patent
Cai et al.

(10) Patent No.: US 12,639,782 B2
(45) Date of Patent: May 26, 2026

(54) SCALABLE IMAGE STORAGE FORMAT

(71) Applicant: REGENTS OF THE UNIVERSITY OF MICHIGAN, Ann Arbor, MI (US)

(72) Inventors: Dawen Cai, Ann Arbor, MI (US); Logan A. Walker, Ann Arbor, MI (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 274 days.

(21) Appl. No.: 18/378,485

(22) Filed: Oct. 10, 2023

(65) Prior Publication Data

US 2024/0144418 A1 May 2, 2024

Related U.S. Application Data

(60) Provisional application No. 63/421,773, filed on Nov. 2, 2022.

(51) Int. Cl.
*G06T 9/00* (2006.01)
*G06T 3/40* (2006.01)

(52) U.S. Cl.
CPC . *G06T 3/40* (2013.01); *G06T 9/00* (2013.01)

(58) Field of Classification Search
CPC .... G06T 3/40; G06T 9/02; G06T 9/00; G06T 9/40; G06T 17/00; G06T 17/05; G06F 40/146; G06F 3/0643; G06F 2212/401; H04N 19/30; H04N 19/31; H04N 19/34; H04N 19/36; H04N 19/647; H04N 19/96; G16H 30/20; G16H 30/40
See application file for complete search history.

(56) References Cited

U.S. PATENT DOCUMENTS 6,154,493 A * 11/2000 Acharya .............. H04N 19/186
375/240.19
2008/0239093 A1* 10/2008 Easwar ................... H04N 1/64
348/222.1

OTHER PUBLICATIONS

Sanchez et al. ("Scalable Learning-Based Sampling Optimization for Compressive Dynamic MRI", IEEE, Published 2020, pp. 8584-8588) (Year: 2000).*
Gözcü et al. ("Learning-Based Compressive MRI", IEEE Transactions on Medical Imaging, vol. 37, No. 6, Jun. 2018, pp. 1394-1405 (Year: 2018).*

(Continued)

*Primary Examiner* — Duy M Dang
(74) *Attorney, Agent, or Firm* — MARSHALL, GERSTEIN & BORUN LLP

(57) ABSTRACT

Methods and systems for storing and accessing image data in a scalable format are disclosed herein. An example method includes (i) generating an image data array representative of one or more images captured by one or more cameras associated with an apparatus; (ii) generating a set of first division arrays, each first division array representative of a different subset of the image data array and sharing a first resolution size; (iii) generating a set of second division arrays, each second division array representative of a different subset of one of the first division arrays in the set of first division arrays and sharing a second resolution size smaller than the first resolution size; and (iv) storing, in a memory, the set of second division arrays such that the set of second division arrays is stored according to an order of the set of first division arrays.

20 Claims, 7 Drawing Sheets

(56)                    References Cited

OTHER PUBLICATIONS

Roossien et al., "Multispectral Tracing in Densely Labeled Mouse Brain With nTracer", Bioinformatics, vol. 35, No. 18, 2019, pp. 3544-3546.

Byna et al., "Tuning HDF5 Subfiling Performance on Parallel File Systems", Cray User Group Conference 2017 (CUG 2017), 9 pages.

* cited by examiner

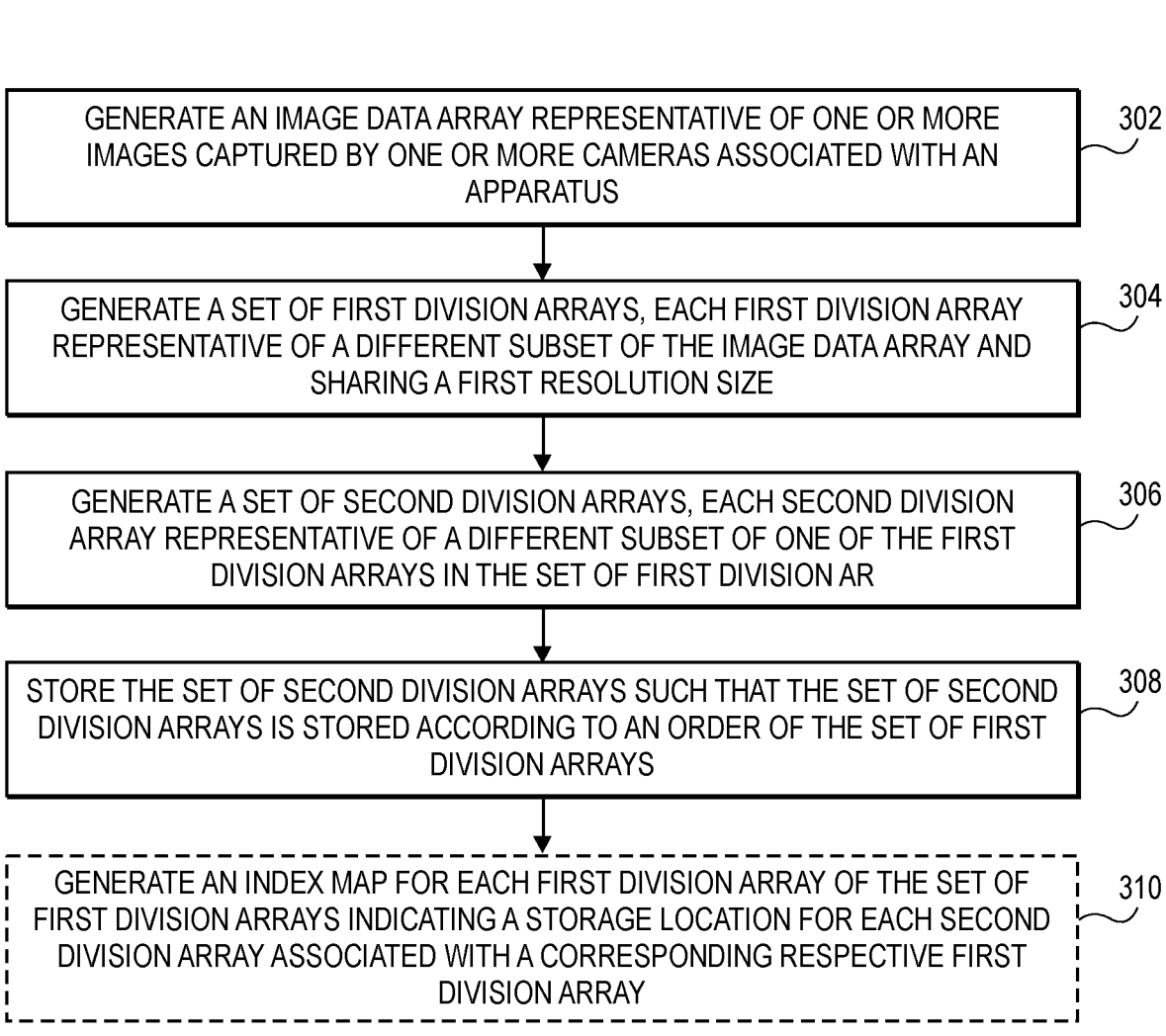

300

302
GENERATE AN IMAGE DATA ARRAY REPRESENTATIVE OF ONE OR MORE IMAGES CAPTURED BY ONE OR MORE CAMERAS ASSOCIATED WITH AN APPARATUS

304
GENERATE A SET OF FIRST DIVISION ARRAYS, EACH FIRST DIVISION ARRAY REPRESENTATIVE OF A DIFFERENT SUBSET OF THE IMAGE DATA ARRAY AND SHARING A FIRST RESOLUTION SIZE

306
GENERATE A SET OF SECOND DIVISION ARRAYS, EACH SECOND DIVISION ARRAY REPRESENTATIVE OF A DIFFERENT SUBSET OF ONE OF THE FIRST DIVISION ARRAYS IN THE SET OF FIRST DIVISION AR

308
STORE THE SET OF SECOND DIVISION ARRAYS SUCH THAT THE SET OF SECOND DIVISION ARRAYS IS STORED ACCORDING TO AN ORDER OF THE SET OF FIRST DIVISION ARRAYS

310
GENERATE AN INDEX MAP FOR EACH FIRST DIVISION ARRAY OF THE SET OF FIRST DIVISION ARRAYS INDICATING A STORAGE LOCATION FOR EACH SECOND DIVISION ARRAY ASSOCIATED WITH A CORRESPONDING RESPECTIVE FIRST DIVISION ARRAY

FIG. 3

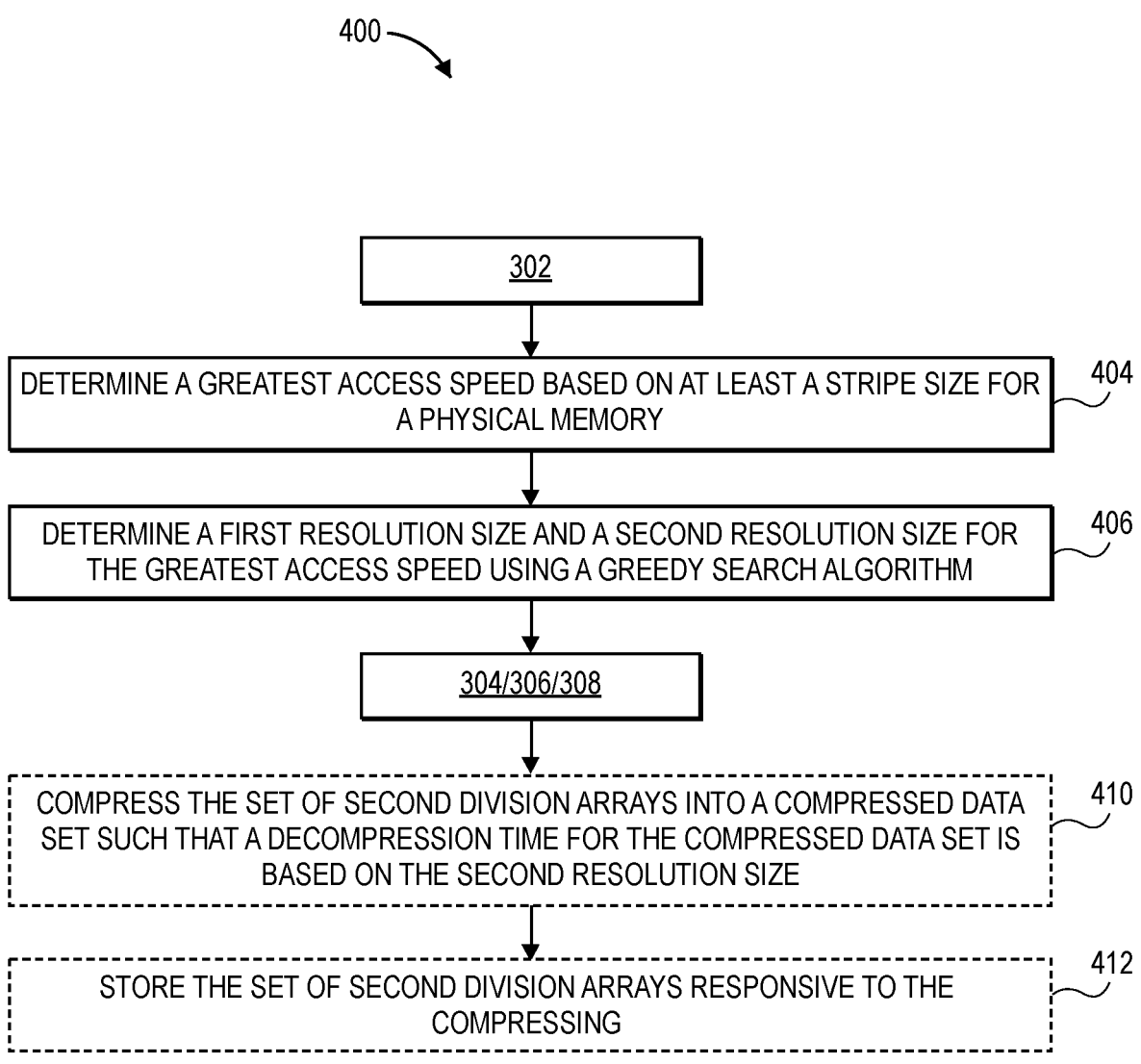

400

302

DETERMINE A GREATEST ACCESS SPEED BASED ON AT LEAST A STRIPE SIZE FOR A PHYSICAL MEMORY — 404

DETERMINE A FIRST RESOLUTION SIZE AND A SECOND RESOLUTION SIZE FOR THE GREATEST ACCESS SPEED USING A GREEDY SEARCH ALGORITHM — 406

304/306/308

COMPRESS THE SET OF SECOND DIVISION ARRAYS INTO A COMPRESSED DATA SET SUCH THAT A DECOMPRESSION TIME FOR THE COMPRESSED DATA SET IS BASED ON THE SECOND RESOLUTION SIZE — 410

STORE THE SET OF SECOND DIVISION ARRAYS RESPONSIVE TO THE COMPRESSING — 412

SCALABLE IMAGE STORAGE FORMAT

CROSS-REFERENCE TO RELATED APPLICATIONS

This application claims priority to and the benefit of the filing date of provisional U.S. Patent Application No. 63/421,773 entitled "SCALABLE IMAGE STORAGE FORMAT," filed on Nov. 2, 2022. The entire contents of the provisional application are hereby expressly incorporated herein by reference.

GOVERNMENT LICENSE RIGHTS

This invention was made with government support under MH123402 and MH124611 awarded by the National Institutes of Health. The government has certain rights in the invention.

FIELD OF THE DISCLOSURE

The present disclosure generally relates to formatting data and, more particularly, to formatting image data to a scalable storage format for storage and/or reading by a computing device.

BACKGROUND

Complex data sets, such as 3D image data, multispectral data, video data, etc. is becoming more important to a number of fields, particularly with regard to research, data processing, etc. For example, digital pathology often requires 3D images for researchers to gain the greatest possible understanding of the organism, tissue, etc. in a native state. However, the imaging performed for such research generates large quantities of data that are unwieldy to store, retrieve, and/or format. For example, multiple cameras that image in parallel through different channels can capture in the range of 200 TB per day from a single microscope instrument. To store, process, and/or retrieve the data, it can require unfeasible quantities of power, resources, and time. Traditional methods require large numbers of hardware for storage, so that a system may read and/or write in parallel.

However, such methods still require a large resource investment, and still require the system to scan the entire storage to find the needed data. As such, there is a need for techniques to format data such that a computing device is able to efficiently store and/or retrieve the data when needed. On the other hand, there is an increasing number of datasets becoming so large that personal devices or even small computer clusters are not capable of accessing such data on a petabyte-scale. Centralized storage and computation resources, such as supercomputer centers operated by companies, research institutions, and government agencies provide sufficient computational resources. However, novel file formats that are optimized for random remote access to data without replicating and transferring them to local users are needed to support such practices.

SUMMARY

In one embodiment, a method for storing and accessing image data in a scalable format may be provided. The method may be implemented via one or more local or remote processors, servers, sensors, transceivers, memory units, and/or other electronic or electrical components. The method may include: (i) generating, by one or more processors, an image data array representative of one or more images captured by one or more cameras associated with an apparatus; (ii) generating, by the one or more processors, a set of first division arrays, each first division array representative of a different subset of the image data array and sharing a first resolution size; (iii) generating, by the one or more processors, a set of second division arrays, each second division array representative of a different subset of one of the first division arrays in the set of first division arrays and sharing a second resolution size smaller than the first resolution size; and (iv) storing, by the one or more processors and in a memory, the set of second division arrays such that the set of second division arrays is stored according to an order of the set of first division arrays.

In a variation of this embodiment, the method further comprises: generating an index map for each first division array of the set of first division arrays indicating a storage location for each second division array associated with a corresponding respective first division array.

In another variation of this embodiment, the first resolution size and the second resolution size are tunable by a user.

In still yet another variation of this embodiment, the method further comprises: determining, using a greedy search algorithm, a first resolution size and a second resolution size for a greatest access speed.

In a further variation of the embodiment, the greedy search algorithm determines the greatest access speed based on at least a stripe size for the memory.

In a still further variation of the embodiment, the second resolution size is approximately equal to the stripe size for the memory.

In another variation of the embodiment, the memory includes at least one of a solid state drive (SSD), a hard disk drive (HDD), a CD drive, or a type device.

In a further variation of the embodiment, the method further comprises: compressing the set of second division arrays into a compressed data set such that a decompression time for the compressed data set is based on the second resolution size; wherein the storing is responsive to the compressing.

In another variation of this embodiment, the image data array is an array with at least three dimensions, and each of the set of first division arrays and each of the set of second division arrays is an array with fewer dimensions than the image data array.

In yet another variation of this embodiment, the one or more image datasets are representative of a tissue of an organism.

In still yet another variation of this embodiment, storing the set of second division arrays includes storing the set of second division arrays at a plurality of storage locations, and the method further includes retrieving the set of second division arrays from the plurality of storage locations as a single dataset.

In another embodiment, a computing system for storing and accessing image data in a scalable format may be provided. The system may include: (a) one or more processors; and (b) computer-readable media storing machine readable instructions that, when executed, cause the one or more processors to: (i) generate an image data array representative of one or more images captured by one or more cameras associated with an apparatus; (ii) generate a set of first division arrays, each first division array representative of a different subset of the image data array and sharing a first resolution size; (iii) generate a set of second division arrays, each second division array representative of a different subset of one of the first division arrays in the set of first division arrays and sharing a second resolution size smaller than the first resolution size; and (iv) store, in a memory, the set of second division arrays such that the set of second division arrays is stored according to an order of the set of first division arrays.

In a variation of this embodiment, the machine readable instructions include instructions that, when executed, cause the one or more processors to further: generate an index map for each first division array of the set of first division arrays indicating a storage location for each second division array associated with a corresponding respective first division array.

In another variation of this embodiment, the first resolution size and the second resolution size are tunable by a user.

In still yet another variation of this embodiment, the machine readable instructions include instructions that, when executed, cause the one or more processors to further: determine, using a greedy search algorithm, a first resolution size and a second resolution size for a greatest access speed.

In a further variation of the embodiment, the greedy search algorithm determines the greatest access speed based on at least a stripe size for the memory.

In a still further variation of the embodiment, the second resolution size is approximately equal to the stripe size for the memory.

In another variation of the embodiment, the memory includes at least one of a solid state drive (SSD), a hard disk drive (HDD), a CD drive, or a type device.

In a further variation of the embodiment, the method further comprises: compressing the set of second division arrays into a compressed data set such that a decompression time for the compressed data set is based on the second resolution size; wherein the storing is responsive to the compressing.

In another variation of this embodiment, the image data array is an array with at least three dimensions, and each of the set of first division arrays and each of the set of second division arrays is an array with fewer dimensions than the image data array.

In yet another variation of this embodiment, the one or more images are representative of a tissue of an organism.

In still yet another variation of this embodiment, storing the set of second division arrays includes storing the set of second division arrays at a plurality of storage locations, and the method further includes retrieving the set of second division arrays from the plurality of storage locations as a single dataset.

In yet another embodiment, a tangible, non-transitory computer-readable medium storing instructions for storing and accessing image data in a scalable format may be provided. The instructions, when executed by one or more processors of a computing device, may cause the computing device to: (i) generate an image data array representative of one or more images captured by one or more cameras associated with an apparatus; (ii) generate a set of first division arrays, each first division array representative of a different subset of the image data array and sharing a first resolution size; (iii) generate a set of second division arrays, each second division array representative of a different subset of one of the first division arrays in the set of first division arrays and sharing a second resolution size smaller than the first resolution size; and (iv) store, in a memory, the set of second division arrays such that the set of second division arrays is stored according to an order of the set of first division arrays.

In a variation of this embodiment, the non-transitory computer-readable medium further includes instructions that, when executed by the one or more processors, cause the computing device to: generate an index map for each first division array of the set of first division arrays indicating a storage location for each second division array associated with a corresponding respective first division array.

In another variation of this embodiment, the first resolution size and the second resolution size are tunable by a user.

In still yet another variation of this embodiment, the non-transitory computer-readable medium further includes instructions that, when executed by the one or more processors, cause the computing device to: determine, using a greedy search algorithm, a first resolution size and a second resolution size for a greatest access speed.

In a further variation of the embodiment, the greedy search algorithm determines the greatest access speed based on at least a stripe size for the memory.

In a still further variation of the embodiment, the second resolution size is approximately equal to the stripe size for the memory.

In another variation of the embodiment, the memory includes at least one of a solid state drive (SSD), a hard disk drive (HDD), a CD drive, or a type device.

In a further variation of the embodiment, the method further comprises: compressing the set of second division arrays into a compressed data set such that a decompression time for the compressed data set is based on the second resolution size; wherein the storing is responsive to the compressing.

In another variation of this embodiment, the image data array is an array with at least three dimensions, and each of the set of first division arrays and each of the set of second division arrays is an array with fewer dimensions than the image data array.

In yet another variation of this embodiment, the one or more images are representative of a tissue of an organism.

In still yet another variation of this embodiment, storing the set of second division arrays includes storing the set of second division arrays at a plurality of storage locations, and the method further includes retrieving the set of second division arrays from the plurality of storage locations as a single dataset.

BRIEF DESCRIPTION OF THE DRAWINGS

FIG. 2 illustrates a diagram depicting a representation of image data and how the system of FIG. 1 divides the image data into the SISF;

FIG. 3 illustrates an example flowchart depicting an example method for storing and/or accessing image data in a scalable format by the system of FIG. 1 and/or via the method of FIG. 4;

FIG. 4 illustrates an example flowchart depicting an example method including further techniques for storing and/or accessing image data in a scalable format, to be implemented in a system such as the system of FIG. 1 and/or including the method of FIG. 3;

DETAILED DESCRIPTION

Figure 1:
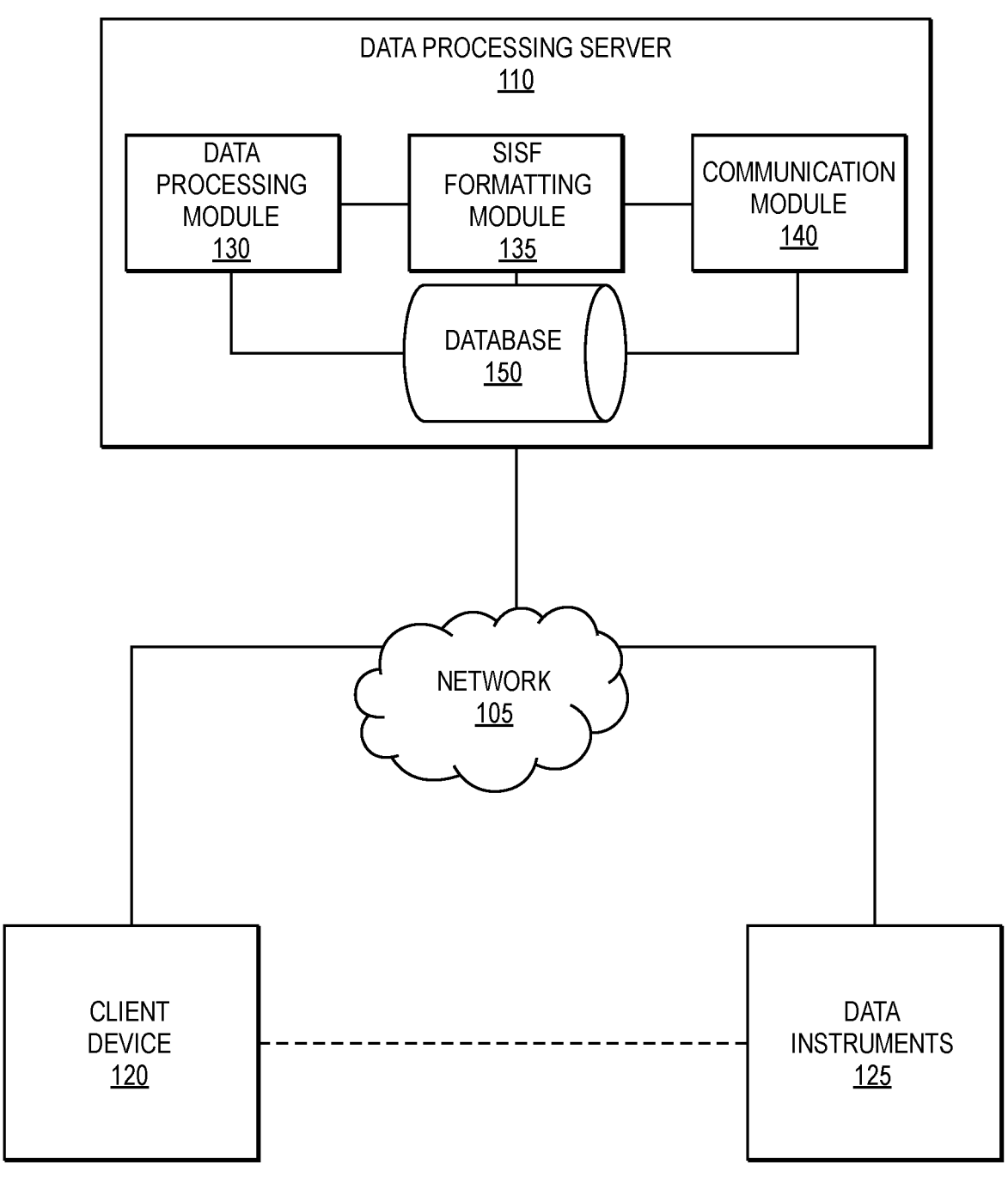
FIG. 1 illustrates a diagram depicting an example system for receiving image data and storing and/or retrieving the data according to a scalable image storage format (SISF)

While current techniques for data processing, storage, and retrieval are operable for many applications, some data processing requires large quantities of data that cannot be easily transferred due to size limitations. For example, techniques such as tissue imaging may require image streams for long periods of time. Even the use of 3 cameras (or a camera with 3 channels), each generating (2048 pixels)$^2$ per frame at a rate of approximately 70 frames per second, generates approximately 6 Gb/s each. A simple 3 camera and/or channel setup, then, may generate approximately 200 TB per day. Transmitting, storing, or retrieving such quantities of data is difficult even for supercomputers due to hardware limitations.

As such, SISF being a technique for formatting and storing vast quantities of data to allow for faster access times is important for a number of fields and applications. In particular, by implementing a strategy in which a system divides image data into a set of arrays with a first resolution and further dividing the set of arrays into a second set of arrays with a second resolution improves the processing and read speed of a computing device while also allowing for data to be transmitted, stored, or retrieved as necessary. In particular, data is stored semi-randomly within each set of arrays, which are then stored linearly. Then each larger set of arrays may include an index map with a small overhead to allow a system to perform a lookup to locate the data within the image array.

It will be understood that, although the present description generally uses two resolution data arrays as examples, the SISF technique can arrange the data organization into an arbitrary number of resolution layers depending on the data structure and/or storage structure. In one example, a time-series 3D image volume data may be formatted in a three resolution layer organization, in which the first resolution is determined by the temporal information while the second and third resolutions correspond to the first and second resolutions in a two resolution layer format, respectively. In another three resolution layer example, the same object may be imaged by different modalities, each of which generates its own 3D dataset. SISF in such a case may use the first resolution layer to format the relationship between modalities and use the second and third resolution layers to format the 3D data arrays. A four resolution layer can then be the combination of the above-mentioned examples, in which SISF may format the time series 3D datasets captured by multiple imaging modalities The use of SISF as described herein disclosed herein is also useful in various applications, such as medical imaging applications, video or high-density data streaming applications, IoT applications, etc. For example, a system implementing SISF as described herein can format, store, and/or read image data for activity in a brain. Imaging a fruit fly brain may produce petabytes worth of data in a week, and other brains of interest (dog, cat, monkey, human, etc.) may yield significantly more data in the same timeframe. By implementing the scalable image storage format framework, computing and imaging systems may more quickly store and read such data, reducing the required resources, power, and processing time that a computer would normally require for such large quantities of data.

In particular, while traditional computers may store such data using a format that organizes the data completely sequentially (e.g., as one continuous file), storing and retrieving data in such a manner requires a significant investment of computer resources, power, and processing time. Further, such techniques may be interrupted and/or limited by the size of individual physical storage memories. Similarly, other traditional computers may format the data using a format that divides the data into a large number of small data chunks. However, formatting data in such a manner requires the system to either subsequently stitch the small chunks together or retain similar problems using large enough chunks to be useful. Using SISF, a system may instead divide the data into large arrays before subdividing the arrays into smaller arrays to maintain the benefits of dividing the data while mitigating concerns with regard to dividing the data arrays such that the data chunks are too small.

The SISF framework may also provide native parallelism in terms of the file structure. For example, the system may process each smaller array without requiring metadata to organize between the larger data arrays, because each larger data array is a discrete grouping. As such, machine learning trained using such data may analyze the training data using only the discrete larger data arrays without needing to additionally split the training data or read from multiple machines.

Similarly, compressing data causes similar delays in required processing time, power, resources, etc. By modulating the size of the divided data arrays, the system may compress relevant data without generating an excess amount of metadata, and allow such compression to happen in parallel while still providing a benefit to the system runtime by reducing the amount of time needed to subsequently decompress.

The SISF framework may also provide native parallelism in terms of the storage structure. For example, in a three level array file structure SISF arrangement, closely related blocks in the smallest array can be stored in the same node of a storage cluster in a supercomputer center. Then the mid-level SISF array naturally arranges the block groups into separate nodes of the same storage cluster. Finally, the highest level SISF array can distribute the mid-level arrays into different storage clusters either in the same supercomputer center or in different centers. As such, the improvements in storage structure via the SISF framework improve remote random access speeds as well as allow for more seamless integration of data when accessing data stored at multiple physical locations.

The SISF framework may also natively provide more file security. In one example, the multi-level SISF files can be backed up in different physical locations (storage clusters and/or supercomputer centers) with a random scrambling arrangement to further reduce the risk of permanently losing part of the data. In another example, groups of data blocks within the smallest array can be encrypted using different algorithms, and then the organization rules of higher levels of arrays can be encrypted by yet another algorithm.

Referring first to FIG. 1, an example system for receiving data from one or more computing devices, data instruments, servers, etc. and formatting the data into a scalable image storage format (SISF) framework includes a network 105, a data processing server 110, and at least one of a client device 120 and/or data instrument(s) 125. The data processing server 110 may additionally include a database 150 as well as various modules to receive, process, format, and or transmit the data, such as data processing module 130, SISF formatting module 135, and/or communication module 140.

The data processing server 110 includes at least one processor and a memory. The memory stores computer-executable instructions that, when executed by the processor, cause the processor to perform one or more of the operations described herein. The processors may include a variety of generic and/or specialized processors (or "processing devices"), such as microprocessors, application-specific integrated circuits (ASOIC), digital signal processors, customized processors, field programmable gate arrays (FPGAs), or any combination thereof.

Similarly, the memory may include a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, or any other suitable memory from which the processor can read instructions. The instructions can include code from any suitable programming language. Though not illustrated in FIG. 1, the data processing server 110 can include and/or is communicatively coupled to one or more computing devices or servers that can perform various functions.

The instructions stored in the memory of data processing server 110 may be instructions for implementing the various functionalities described herein for respective systems, as well as any data relating thereto, generated thereby, or received via any communications interface(s) and/or input device(s). In some implementations, the data processing server 110 includes the memory to store data structures and/or information related to, for example, software components of the data processing server 110 and/or algorithms used in formatting data, analyzing data, determining memory characteristics, etc. as described in more detail below. In some such implementations, the memory includes or is part of the database 150. The processor(s) may execute instructions stored in the memory and, in so doing, may also read from and/or write to the memory various information processed and/or generated pursuant to execution of the instructions.

The processor(s) of the data processing server 110 also may be communicatively coupled to and/or control a communications module 140 including a communications interface of the data processing server 110 to transmit and/or receive various information pursuant to execution of instructions via the network 105. For example, the communications interface(s) of the communications module 140 may be coupled to a wired or wireless network, bus, and/or other communication means, and may therefore allow the data processing server 110 to transmit information to and/or receive information from other devices (e.g., other computer systems). Moreover, one or more communication interfaces facilitate information flow between the components of the data processing server 110. In some implementations, the communications module 140 may be configured (e.g., via various hardware and/or software components) to provide a website, application programming interface (API), and/or application to at least some aspects of the data processing server 110 as an access portal.

Further, the data processing server 110 may include output devices that, for example, allow a user to view and/or otherwise perceive various information in connection with the execution of the instructions. Similarly, the data processing server 110 may include input devices that, for example, allow a user to make manual adjustments, make selections, enter data, and/or interact in any of a variety of manners with the processor during execution of the instructions.

In some implementations, the network 105 can be and/or include any wireless or wired networks through which computing devices may communicate. For example, the network 105 may include the Internet, a local area network (LAN), a wide area network (WAN), a metropolitan area network, one or more intranets, an optical network, a cellular network, a satellite network, other types of data network, and/or a combination thereof.

The data processing server 110 is capable of communicating via the network 105 with one or more client devices 120 and/or data instruments 125. The network 105 can include any number of network devices, such as gateways, switches, routers, modems, repeaters, and wireless access points, among others. The network 105 can also include computing devices such as computer servers. The network 105 can further include any number of hardwired and/or wireless connections.

The one or more client devices 120 can include a computing device configured to acquire, display, and/or transmit data to be analyzed by the data processing server 110 as well as receive content (e.g., third-party content items such as texts, software programs, images, and/or videos) provided by the data processing server 110 and/or the data instruments 125. The client device 120 can transmit and/or request and receive such content via the network 105. In some implementations, the client device 120 is hardwired to the data instruments 125, shares a wireless connection with the data instruments 125, and/or otherwise communicates with the data instruments via a separate network (not shown).

The client device 120 can include a desktop computer, laptop computer, tablet device, smartphone, personal digital assistant, mobile device, consumer computing device, server, digital video recorder, set-top box, smart television, or any other computing device capable of communicating via the network 105 and transmitting and/or receiving the data and/or analysis for data processing server 110 and/or the data instruments 125. While FIG. 1 shows a single client device 120, it will be understood that the system 100 can include a plurality of client devices 120 served by the data processing server 110.

The data instruments 125 can include devices used to gather, capture, or otherwise generate raw data for the client device 120 and/or the data processing server 110 to use, format, transmit, etc. The raw data can include image data, video data, audio data, facial recognition data, hyper/multi-spectral image data, multi-lead signal data, higher-order statistical data, ECG signal data, anatomic data, or any other such input data. Depending on the implementation, the data instruments 125 may be or may include image cameras, video cameras, camera arrays, etc. In some implementations, the client device 120 includes one or more controllers for the data instruments 125, an example of which is described below with regard to FIG. 6. Similarly, the data instruments 125 may receive instructions from the one or more controllers of the client device 120 and/or a stage control system of the client device 120.

The database 150 can maintain a data structure such as a table of virtual user identifiers, corresponding user identifiers and/or characteristics, and cookies associated with the virtual user identifiers. The database 150 can further maintain one or more data structures regarding database and/or client device identifiers and/or information, such as a tree, a linked list, a table, a string, or a combination thereof.

The data processing server 110 further includes a number of modules for receiving, processing, formatting, and/or otherwise interacting with the data. In some implementations, the data processing server 110 includes a data processing module 130, an SISF formatting module 135, and/or a communication module 140. Depending on the implementation, each of the data processing module 130, SISF formatting module 135, and/or communication module 140 can be implemented as a software module, hardware module, or a combination of both. For example, each module can include a processing unit, server, virtual server, circuit, engine, agent, appliance, or other logic device such as programmable logic arrays configured to communicate with the database 150 and/or with other computing devices via the network 105. The computer-executable instructions stored in the memory of the data processing server 110 can include instructions which, when executed by one or more processors, cause the data processing server 110 to perform operations discussed below with regard to any of and/or any combination of the data processing module 130, SISF formatting module 135, and/or communication module 140.

It will be understood that, although the present description generally uses 3D data arrays (e.g., 3D tensors) as examples, the techniques described herein may be applied to arrays/tensors of any size by properly expanding the techniques in question, including additional tensor dimensions representing time-series data or multiple spectral channels. Similarly, although the techniques described herein may explicitly describe image data for simplicity, the techniques described herein may apply to any similar data.

The communication module 140 may receive data for the data processing server 110 to process, format, store, read, transmit, etc. via one or more modules, such as the data processing module 130 and/or the SISF formatting module 135, or databases, such as database 150, described herein for some embodiments. Depending on the implementation, the communication module 140 may receive data such as image data, video data, spectral data, etc. from the client device 120 and/or data instruments 125 via the network 105. In some implementations, the communication module 140 receives an image data array generated by the data instruments 125 and/or client device 120. The communication module 140 may then transmit the data to the data processing module 130, the SISF formatting module 135, the database 150, etc. In further implementations, the communication module 140 retrieves the data from modules and/or databases of the data processing server 110 (e.g., the data processing module 130, SISF formatting module 135, database 150, etc.) after formatting into the SISF framework and transmits the data to another device, such as an application server, another data processing server, another client device, an interface device associated with the data processing server, etc.

The data processing module 130 receives data from other components of the system 100. In particular, the data processing module 130 can receive data from the database 150 and from the client device 120 and/or data instruments 125. Depending on the implementation, the data processing module 130 may receive the data from the client device 120 and/or the data instruments 125 via the network 105 or via the communication module 140. In further implementations, the data processing module may receive the data from the SISF formatting module 135 after the data is formatted.

Depending on the implementation, the data processing module 130 may determine, based on the data, physical characteristics of the data processing server 110, user input, etc., a potential greatest access speed for the memory. The greatest access speed may be a greatest access speed for a potential quantity of data, a predicted greatest access speed, a greatest access speed in exchange for a predetermined quantity of resources and/or power usage, some combination of the above, etc. In further implementations, the data processing module 130 may additionally or alternatively determine a potential minimal power usage, minimal resource usage, etc. Depending on the implementation, the data processing module 130 may use a stripe size (also referred to herein as "striping size") associated with the data processing server 110 to determine the greatest access speed. In some implementations, a striping size is the size of a file split across one or more hard disk drives ("HDDs"). For example, for a device with 100 HDDs and a file spread across the HDDs, each portion having a size of 1 MB has a total stripe size of 100 MB.

The SISF formatting module 135 receives input data from the data processing module 130 and/or the communication module 140. The SISF formatting module 135 then formats the received data into the SISF framework. In particular, the SISF formatting module 135 determines and/or receives a first resolution size and divides the received data array into a set of first division arrays, each first division array representative of a different subset of the data array based on the first resolution size.

The SISF formatting module 135 then determines and/or receives a second resolution size and divides the each division array in the set of first division arrays into a set of second division arrays based on the second resolution size. The SISF formatting module 135 may then transmit the formatted data to the data processing module 130, communications module 140, database 150, etc. for the module and/or database in question to store the data. Depending on the implementation, the set of second division arrays may be stored according to row major formatting techniques, column major formatting techniques, etc. As such, the data processing module 130 does not jump between datasets when reading and/or storing, which improves overall efficiency of the system. In some implementations, the SISF formatting module 135 manages dividing the data set into the set of first division arrays and the subsequent division into sets of second division arrays as otherwise described herein, particularly with regard to FIGS. 3 and 4 below.

Depending on the implementation, the data processing module 130 and/or the SISF formatting module 135 may determine the first resolution size and/or the second resolution size for the data based on the determined greatest access speed, minimal power usage, minimal resource usage, etc. The data processing module 130 and/or the SISF formatting module 135 may make the determination using an algorithm, such as a greedy search algorithm. In some implementations, the algorithm is trained using machine learning techniques, as described in more detail below.

In some implementations, the data processing module 130 and/or the SISF formatting module 135 may additionally or alternatively determine at least one of the first resolution size and/or the second resolution size for the data to match the stripe size for the data processing server 110. In further implementations, the data processing module 130 and/or the SISF formatting module 135 receives user inputs to set the first resolution and/or second resolution. As such, the user may tune the first resolution size and/or the second resolution size even if the data processing module 130 and/or the SISF formatting module 135 determines another value.

Depending on the implementation, the data processing module 130, SISF formatting module, and/or the database 150 stores the data linearly within the database 150. For example, the data processing module 130, SISF formatting module, and/or the database 150 may store each first division array such that the end of the final second division array in a given first division array is sequential to the beginning of the first second division array in the next first division array.

In still other implementations, the data processing module 130, SISF formatting module, and/or the database 150 stores the set of second division arrays by semi-randomly dividing the data and appending the data to the end of the file associated with a particular first division array. Depending on the implementation, the first division arrays may be stored linearly. In implementations in which the data processing module 130, SISF formatting module, and/or the database 150 stores the set of second division arrays semi-randomly within a first division array, the data processing module 130, SISF formatting module, and/or the database 150 may generate an index map that may include header info (e.g., a size, type, name, etc.) and then mapping for each of the second division arrays within the first division array. As such, the use of the SISF framework may allow a device reading the data to jump to the proper location without requiring linearization within each first division array and subsequently may decompress and/or read the data in question. Depending on the implementation, the first division array and/or the second division array may be organized according to a particular format library, such as an HDF5 library, for particular file management. In some implementations, each first division array may be represented by a file within a folder representing the dataset as a whole, and each file stores the second division arrays. As such, a data processing server 110 storing data in such a manner improves over standard techniques by having the file format along with easy ability to jump to a given data array within such a file.

To read the data, the data processing module 130 and/or the database 150 locates the first division array that includes the appropriate second division array. The data processing module 130 and/or the database 150 then locates the appropriate second division array in the first division array. In some implementations, the data processing module 130 and/or the database 150 uses an index map stored in overhead of each first division array that lists the location of each second division array within the first division array to determine whether the first division array includes the second division array. The data processing module 130 and/or the database 150 may search each first division array in turn, use a similar table for each first division array, etc.

In some implementations, the system 100 performs the module functions as outlined above using one or more algorithms and/or a neural network. To train the algorithms and/or neural network, the system 100 uses training data to improve the functionality of the modules as implemented above. In particular, in some implementations, the system 100 trains the algorithms and/or neural network using a supervised machine learning program or algorithm. The neural network may be a convolutional neural network, a deep learning neural network, or a combined learning module or program that learns in two or more features or feature datasets (e.g., determining the coordinates and classification for input data) in a particular area of interest. The machine learning programs or algorithms may also include natural language processing, semantic analysis, automatic reasoning, regression analysis, support vector machine (SVM) analysis, decision tree analysis, random forest analysis, k-Nearest neighbor analysis, naïve Bayes analysis, clustering, reinforcement learning, and/or other machine learning algorithms and/or techniques. In some embodiments, the machine learning based algorithms may be included as a library or package executed on a computing platform (e.g., user computing device 102). For example, libraries may include the TENSORFLOW based library, the PYTORCH library, and/or the SCIKIT-LEARN Python library.

In supervised machine learning, a machine learning program operating as a neural network on a server, computing device, or other processor(s), may be provided with example inputs (e.g., "features" and/or "labels") and their associated, or observed, outputs (e.g., "labels") in order for the machine learning program or algorithm in the neural network to determine or discover rules, relationships, patterns, or otherwise machine learning "models" that map such inputs (e.g., "features") to the outputs (e.g., "labels"), for example, by determining and/or assigning weights or other metrics to the model across its various feature categories. The training module may then provide such rules, relationships, or other models subsequent inputs in order for the neural network, executing on the server, computing device, or other processor(s), to predict, based on the discovered rules, relationships, or model, an expected output.

Machine learning may involve identifying and recognizing patterns in existing data (such as training a neural network based on labeled classes and training data) in order to facilitate making predictions or identification for subsequent data (such as using the neural network on new data in order to determine a first resolution size and/or second resolution size for performing the SISF procedure as detailed above).

Figure 2:
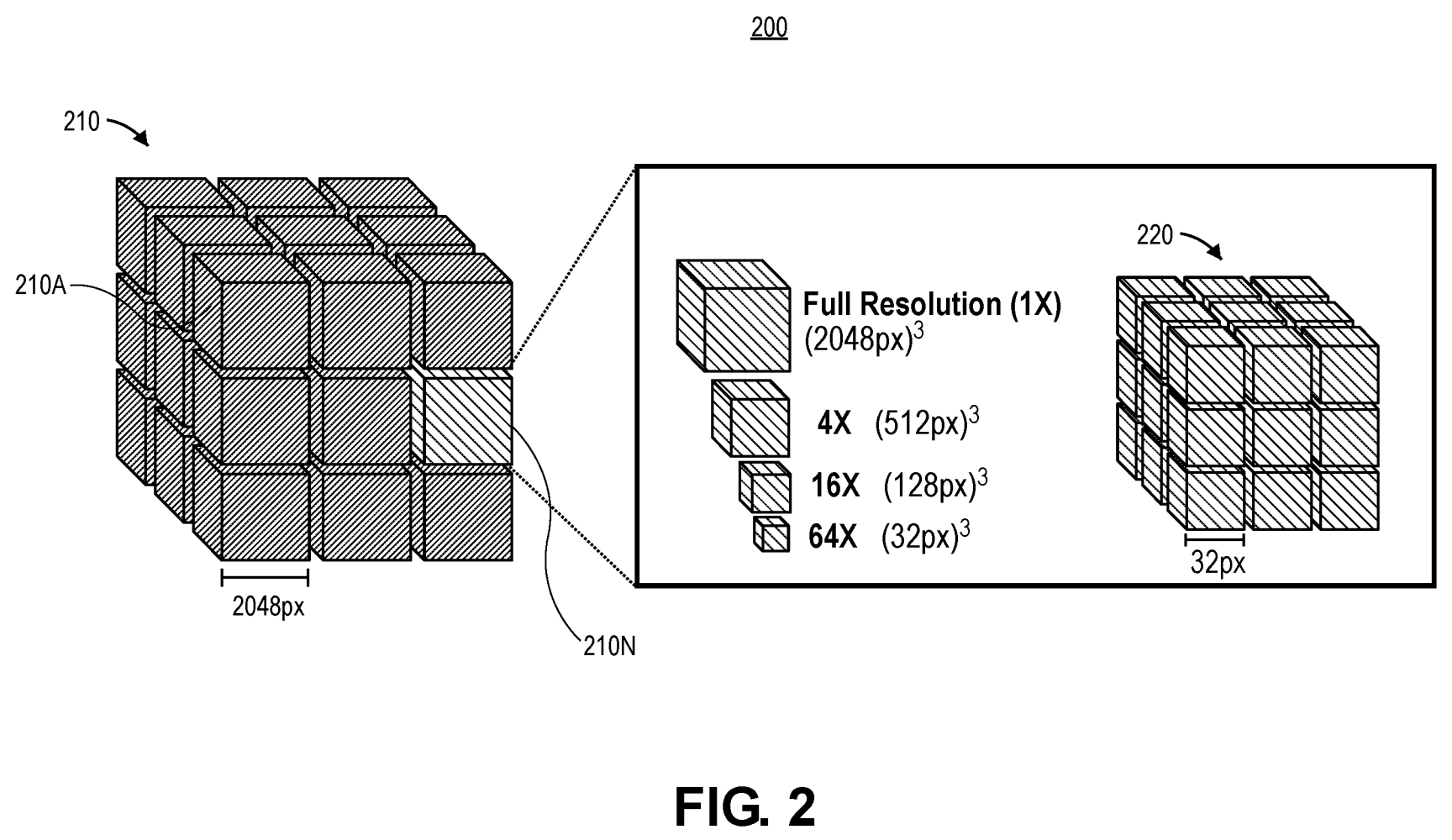

Referring next to FIG. 2, a diagram 200 illustrates an example representative of how image data may be stored in the SISF. In particular, diagram 200 illustrates a set of divided data arrays 210 and a set of second division arrays 220. Although the diagram 200 is described below with regard to the system 100 and various components thereof, it will be understood that reference to system 100 is for exemplary purposes only. Other such similar arrangements of modules and components as described herein may similarly perform the functions as described below.

In the exemplary embodiment of diagram 200, the system 100 divides received, captured, etc. image data into a set of first division arrays 210. Each data array 210A-210N in the set of first division arrays 210 is representative of at least a portion of the image data. Depending on the implementation, each row, column, intersection of each row and column, etc. may represent a different portion of the image data (e.g., a different picture of a series of pictures, a different area of a single picture, a different timestamp of a single area, etc.). In implementations in which the image data includes more than two dimensions (e.g., 3D tensors, 4D tensors, N-dimensional tensors, etc.), each slice, set of rows and columns in a mode, intersection between a row, column, and mode, etc. may additionally or alternatively represent a different portion of the image data. For example, in the exemplary embodiment of diagram 200, each block intersecting between a row, column, and mode may be representative of a different $(2048 \text{ pixels})^3$ portion of the image data.

Although the exemplary embodiment of diagram 200 depicts each data array 210A-210N as a $(2048 \text{ pixels})^3$ cube, it will be understood that each data array 210A-210N may be any suitable size (e.g., $(1024 \text{ pixels})^3$, $(512 \text{ pixels})^3$, $(256 \text{ pixels})^3$, etc.). Similarly, each data array 210A-210N may be a different shape other than a cube, depending on the implementation. In some implementations, at least some of the data array 210A-210N are filled with empty data (e.g., a series of "0" values). For example, if the image data is not cleanly divisible, the final data array may be automatically filled with empty data. In further implementations, each data array has at least some empty data instead of only a single data array. In still further implementations, the system 100 automatically stops reading data in a data array in response to determining that no further image data values remain.

Each data array 210A-210N is further divided into a set of second division arrays 220. In some implementations, each data array in the set of second division arrays 220 is a tensor with the same number of dimensions as the corresponding data array 210N in the set of first division arrays 210 (e.g., for a 3D data array 210N, the set of second division arrays 220 are 3D data arrays). Depending on the implementation, each data array of the set of second division arrays 220 has a resolution no greater than the resolution of the corresponding data array 210N in the set of first division arrays 210. For example, in the exemplary embodiment of diagram 200, each data array in the set of second division arrays 220 has a resolution of $(32 \text{ pixels})^3$ (e.g., each data array is a cube with sides 32 pixels long) for a corresponding data array 210N with a resolution of $(2048 \text{ pixels})^3$.

Depending on the implementation, each data array in the set of second division arrays 220 may have any suitable resolution, such as $(2048 \text{ pixels})^3$, $(512 \text{ pixels})^3$, $(128 \text{ pixels})^3$, $(32 \text{ pixels})^3$, etc. The resolution sizes may also depend on the requirements or parameters of the data instrument 125 used to produce stored data (e.g., the size of images captured by a specific camera, the number of electrodes in a neurological recording device, etc.). Similarly, the resolution may depend on the degree of division for the set of second division arrays 220. As such, the resolution for the set of second division arrays 220 may be a full resolution (e.g., same size), 4× resolution, 16× resolution, 64× resolution, etc. In some implementations, the set of second division arrays 220 functions and/or is generated similarly to the set of first division arrays 210, and implementations described with regard to such apply to the set of second division arrays 220 as well.

In some implementations, the first and/or second resolution may be determined by the system 100 prior to dividing the image data into the set of first division arrays 210 and/or the set of second division arrays 220. In some such implementations, the system 100 may utilize an algorithm to determine values that lead to the best performance from the system 100 according to a predetermined parameter. For example, the system 100 may use a greedy search algorithm to determine which resolution provides the fastest performance, the least power-intensive performance, etc. Depending on the implementation, the system 100 may take device parameters into account in determining which resolution to use. For example, the system 100 may determine to use the stripe size of a memory for the second resolution. In some implementations, the system 100 may make the determination to use the strip size separately (e.g., the algorithm determines that the stripe size is the preferred size), or the system 100 may determine and/or receive the stripe size and automatically set the second resolution based on the stripe size.

It will be understood that, although the set of first division arrays 210 and the set of second division arrays 220 are depicted in diagram 200 as cubes, the image data may or may not be for a 3D image. Depending on the implementation, the third dimension may be representative of passing time for a video stream, a 3D image, another portion of an image stored such that a 3D tensor represents the 2D image, etc. In further implementations, the third dimension may be for visualization purposes only. Further, the set of first division arrays 210 may not be in the shape of cubes, but instead may be rectangles, circles, or any other similar shape.

Referring next to FIG. 3, a flowchart illustrates an example method 300 for storing and/or accessing image data in a scalable format by a computing system as described herein. The method of FIG. 3 may be implemented in a system 100 as described with regard to FIG. 1 above. Though the method below is described with regard to system 100, it will be recognized that any similarly suitable system may be used to implement method 300.

At block 302, the system 100 generates an image data array representative of one or more images captured by one or more cameras associated with an apparatus. In some implementations, the image data array is a multidimensional array, such as a 3D array.

At block 304, the system 100 generates a set of first division arrays, each first division array representative of a different subset of the image data array. In some implementations, each first division array shares a first resolution size. In further implementations, the first resolution size is tunable by a user. As such, a user may select a resolution size for each first division array. In other implementations, the system 100 automatically determines a first resolution size. For example, the system 100 may determine a resolution size that the system 100 predicts to allow for the greatest access speed in reading stored data, as described in more detail with regard to FIG. 4 below. Depending on the implementation, the first resolution size may be $(4096 \text{ pixels})^3$, $(2048 \text{ pixels})^3$, $(1024 \text{ pixels})^3$, etc.

At block 306, the system 100 generates a set of second division arrays, each second division array representative of a different subset of one of the first division arrays in the set of first division arrays. In some implementations, each second division array may share a second resolution size smaller than the first resolution size. Similar to block 306, in further implementations, the second resolution size is tunable by a user. As such, a user may select a resolution size for each second division array. In other implementations, the system 100 automatically determines a second resolution size, as described in more detail below with regard to FIG. 4. In implementations in which the image data array is a multidimensional array, each of the set of first division arrays and the set of second division arrays is also a multidimensional array. In some such implementations, each of the set of first division arrays and the set of second division arrays has the same number of dimensions as the image data array (e.g., when the image data array is a 3D array, each of the set of first division arrays and the set of second division arrays is also a 3D array). Depending on the implementation, the second resolution size may be $(512 \text{ pixels})^3$, $(128 \text{ pixels})^3$, $(32 \text{ pixels})^3$, etc.

At block 308, the system 100 stores the set of second division arrays such that the set of second division arrays is stored according to an order of the set of first division arrays. In some implementations, the system 100 stores the set of second division arrays semi-randomly within the corresponding first division array, but not compared to other first division arrays. For example, the system 100 may store the set of second division arrays semi-randomly within each of two neighboring first division arrays, but such that the latter first division array data is received and/or generated prior to the former first division array data. In further implementations, the system 100 instead stores the set of first division arrays linearly and the set of second division arrays semi-randomly within each corresponding first division array. In still further implementations, the system 100 stores the set of first division arrays and the set of second division arrays linearly.

In other implementations, the system 100 stores the set of second division arrays by semi-randomly dividing the data and appending the data to the end of the file associated with a particular first division array. At block 310, the system 100 may generate an index map for each first division array indicating a storage location for each second division array associated with a corresponding respective first division array. As such, when reading the stored data, the system 100 may access the index map for the corresponding first division array to determine a storage location for the second division array(s) the system 100 is searching for. In implementations in which the system 100 stores the set of second division arrays semi-randomly within a first division array, the index map may include header info (e.g., a size, type, name, etc.) and then mapping for each of the second division arrays within the first division array. As such, the use of the SISF framework may allow a device reading the data to jump to the proper location without requiring linearization within each first division array and subsequently may decompress and/or read the data in question.

Referring next to FIG. 4, a flowchart illustrates an example method 400 for storing and/or accessing image data in a scalable format by a computing system as described herein. The method of FIG. 4 may be implemented in a system 100 as described with regard to FIG. 1 above. Though the method below is described with regard to system 100, it will be recognized that any similarly suitable system may be used to implement method 400.

Depending on the implementation, the method 400 may begin after block 302 as described with regard to FIG. 3 above. In further implementations, the method 400 may begin prior to or in conjunction with block 302.

At block 404, the system 100 determines the greatest access speed for a physical memory. In some implementations, the system 100 determines the greatest access speed based on at least a stripe size for the physical memory. For example, the system 100 may simulate, estimate, and/or otherwise determine the access speed for data matching the stripe size and proceed with the determined access speed as the greatest access speed. In further implementations, the system 100 simulates, estimates, and/or otherwise determines the access speed for data matching the stripe size and subsequently checks data with sizes above and below until the system 100 determines a greatest access speed. Similarly, the system 100 may determine a greatest access speed for the physical memory using other such techniques.

At block 406, the system 100 determines a first resolution size and a second resolution size for the greatest access speed as determined at block 404. In some implementations, the system 100 determines the first and/or second resolution size using a greedy search algorithm. In further implementations, the system 100 may determine the second resolution size based on a stripe size for the memory. For example, the system 100 may determine that a greatest access speed occurs when the second resolution size is approximately equal to the stripe size for the memory.

Depending on the implementation, flow may continue to block(s) 304, 306, and/or 308 after block 406. As such, in some implementations, the system 100 generates the set of first and/or second division arrays according to the first and/or second resolution size determined at block 406. In further implementations, the system 100 performs block 406 substantially in conjunction with blocks 304, 306, and/or 308. For example, at block 406 the system 100 may first determine a first resolution size before performing block 304, then the system 100 may continue to determine a second resolution size before performing blocks 306 and 308.

At block 410, the system 100 may compress the set of second division arrays into a compressed data set such that a decompression time for the compressed data set is based on the second resolution size. Depending on the implementation, the system 100 may compress the set of second division arrays when the physical memory is a solid state drive (SSD). In such implementations, the system 100 may compress the data in accordance with an encoding/compression algorithm. Depending on the implementation, the compression algorithm may include and/or may be trained via machine learning. In further implementations, the compression algorithm(s) may include techniques such as a discrete cosine transform (DCT), a Lempel-Ziv-Welch (LZW) algorithm, a "blocking" (BLOSC) algorithm, wavelet compression, etc.

At block 412, the system 100 may then store the compressed set of second division arrays responsive to the compressing. In some implementations, block 412 replaces or supplements block 308 of FIG. 3. In some implementations, compressing may be performed for individual first division arrays but not others. Depending on the implementation, metadata related to the compressing (e.g., for the system 100 to use in decompressing) may be stored within a folder or file associated with the first division array. In some implementations, increasing the size of a particular first division array or second division array may subsequently increase the period of time required to decompress the particular array.

Figure 5A:
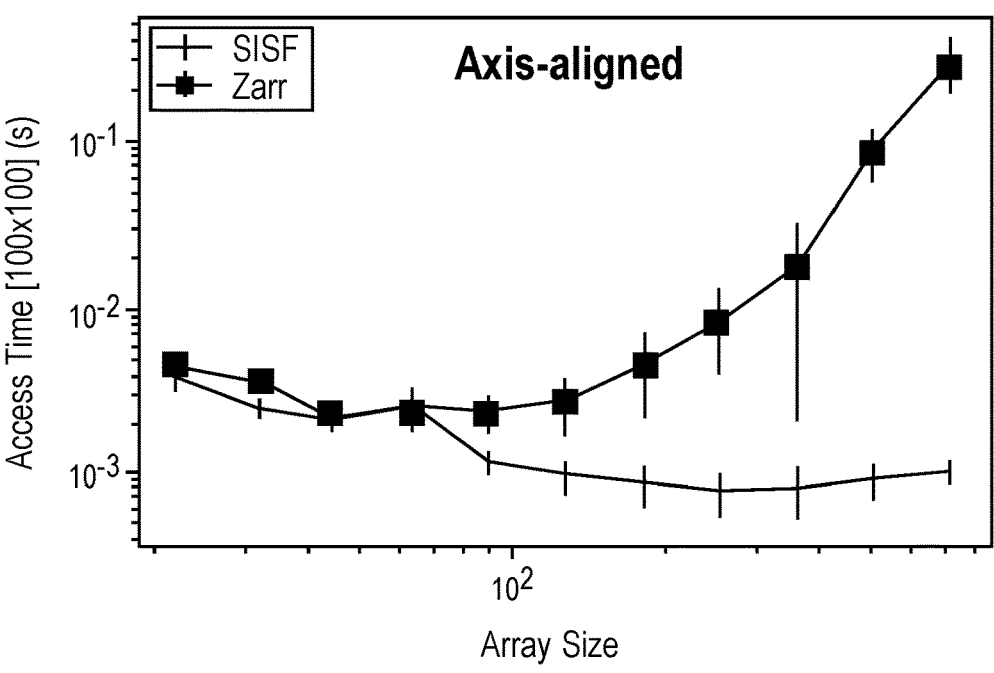
FIG. 5A illustrates a graph depicting the change in access time required based on the array size for axis-aligned image data.
Figure 5B:
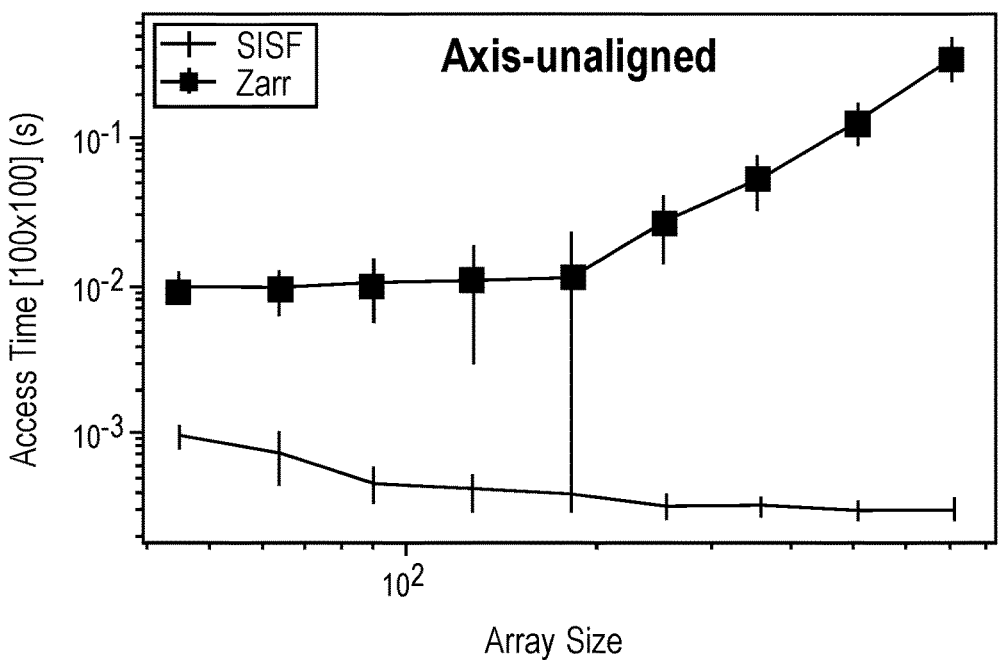
FIG. 5B illustrates a graph depicting the change in access time required based on the array size for axis-unaligned image data.

Referring next to FIGS. 5A and 5B, graphs 500A and 500B illustrate the performance of SISF compared to other techniques by setting the access time against the size of each second division array. The exemplary graphs 500A and 500B are representative of performance of a system such as system 100 when reading 100 random $(100 \text{ pixels})^2$ tiles from uncompressed $(10000 \text{ pixels})^3$ files stored according to the SISF format and a Zarr format.

In the exemplary embodiment of graph 500A, the system is axis-aligned, and therefore reads data in the dimension in which the data is stored. As the graph 500A illustrates, the SISF format generally performs better than other formats regardless of the size of the second division array. At higher sizes, however, the SISF techniques outperform other techniques by a wider margin, maintaining a relatively low read time throughout.

In the exemplary embodiment of graph 500B, the system is axis-unaligned, and therefore the system reads data more sporadically, such as by reading and then skipping a line. In such an implementation, the SISF format performs an order of magnitude better than the other techniques, regardless of the size of the second division array. Similarly to graph 500A, however, the disparity increases as the array size increases.

Figure 6:
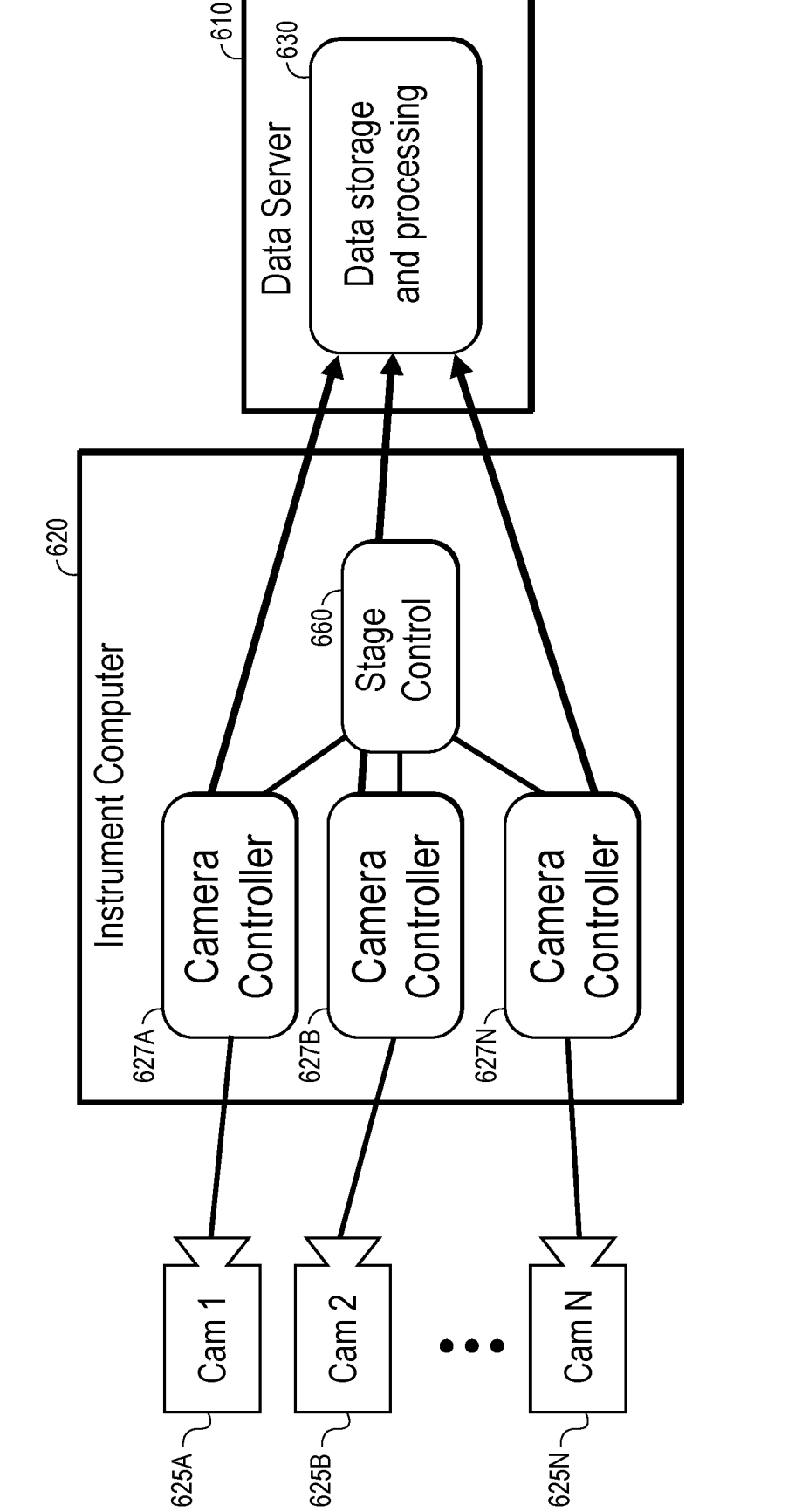
FIG. 6 illustrates a diagram for an example implementation of a system such as the system described in FIG. 1.

Referring next to FIG. 6, an example system 600 detailing an example implementation of system 100 includes a data server 610, an instrument computer 620, and a number of cameras 625. In the exemplary embodiment of system 600, the cameras 625 may include a total of N cameras, 625A-625N. Similarly, the instrument computer 620 may include a number of camera controllers 627. In some implementations, the instrument computer 620 may include an equal number of camera controllers 627A-N and cameras 625A-N. In some such implementations, a stage control 660 controls each of the camera controllers to ensure operations are properly performed across the cameras 625. In further implementations, the data server 610 includes a data storage and processing module 630, that may function similarly to modules 130, 135, and/or 140 and database 150 as described above with regard to FIG. 1.

In some implementations, each camera 625A-N captures image data and/or streams the data substantially in parallel. As such, although the exemplary embodiment of FIG. 6 depicts each camera controller 627A-N in the instrument computer 620 receiving data from each camera 625A-N, in some implementations at least some of cameras 625A-N may transmit data to other instrument computers, data servers, etc. In further implementations, the instrument computer 620 includes a multicore CPU that handles receiving and/or processing image data from the cameras 625.

Figure 7:
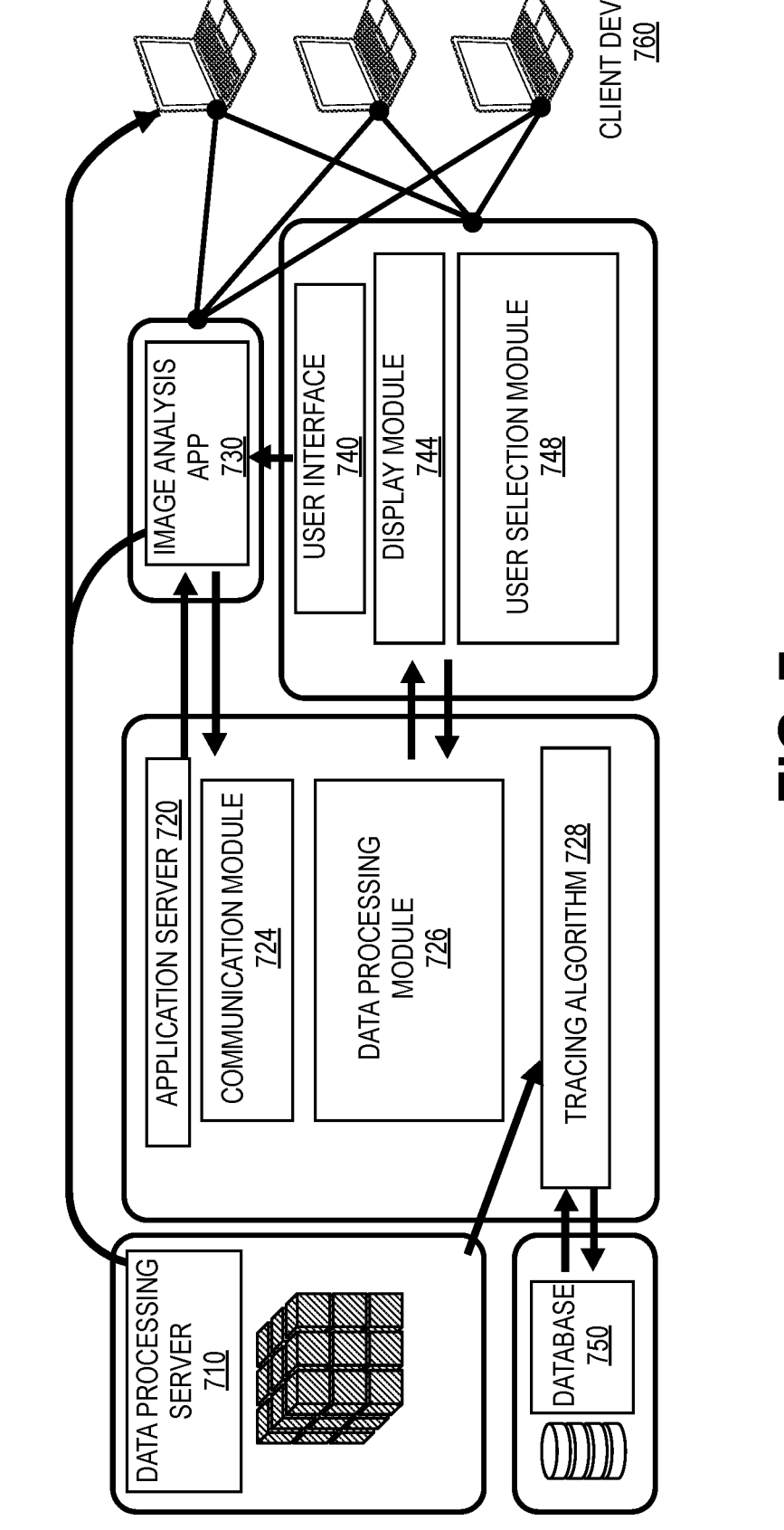
FIG. 7 illustrates a diagram for an example implementation of processes to which a system such as the system described in FIG. 1 may be connected.

Referring next to FIG. 7, another example system 700 detailing an example implementation of processes to which system 100 may be connected includes a data processing server 710, a database 750, an application server 730, an image analysis application 730, a user interface 740, and client devices 760. Depending on the implementation the data processing server 710 may function similarly to the data processing server 110 as described above with regard to FIG. 1.

In some implementations, the application server 720 includes a communication module 724, a data processing module 726, and/or a tracing algorithm 728. Similarly to the data processing server 710, the communication module 724, data processing module 726, and database 750 may be similar to and/or include portions of the communication module 140, data processing module 130, and database 150 as described above with regard to FIG. 1. In further implementation, the tracing algorithm 728 may be stored on the application server 720 and may be used by the server 720 (such as by the data processing module 726) to simulate the computational load of the data in the SISF framework from the data processing server 710 before the transfer actually occurs.

The image analysis application 730 may be or include a program designed to utilize data such as imaging data to perform the functionality of the application. For example, the image analysis application 730 may be a visualization application designed to display cross-sectional views of image data. In some implementations, the image analysis application may receive data from the data processing server (e.g., via the application server 720) to generate the views, information, etc. Depending on the implementation, the image analysis application may be for analyzing images, video stream data, multispectral data, or any other form of data in the SISF framework.

The user interface 740 may receive data from the application server 720 and/or image analysis application 730. In some implementations, the user interface 740 may receive input from a user, such as via a user selection module 748, and may communicate with the application server 720 and/or image analysis application 730 in performing an analysis of the SISF data from the data processing server. In further implementations, the user interface 744 may include a display module 744 to cause one or more client device 760 or the user interface 740 to render the SISF data from the data processing server 710, the views from the image analysis application 730, etc. Similarly, depending on the implementation, the client devices 760 may include or be communicatively coupled to the user interface 740 and/or image analysis application 730 in order to analyze the data processing server 710. Depending on the implementation, the client devices 760 may be supercomputers, standard computing devices, computing devices communicatively coupled to supercomputers, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Moreover, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A method for storing and accessing image data in a scalable format, the method comprising:
    generating, by one or more processors, an image data array representative of one or more images captured by one or more cameras;
    generating, by the one or more processors, a set of first division arrays, each first division array representative of a different subset of the image data array and sharing a first resolution size;
    generating, by the one or more processors, a set of second division arrays, each second division array representative of a different subset of one of the first division arrays in the set of first division arrays and sharing a second resolution size smaller than the first resolution size; and
    storing, by the one or more processors and in a memory, the set of second division arrays such that the set of second division arrays is stored according to an order of the set of first division arrays.

2. The method of claim 1, the method comprising:
    generating an index map for each first division array of the set of first division arrays indicating a storage location for each second division array associated with a corresponding respective first division array.

3. The method of claim 1, wherein the first resolution size and the second resolution size are tunable by a user.

4. The method of claim 1, further comprising:
    determining, using a greedy search algorithm, a first resolution size and a second resolution size for a greatest access speed.

5. The method of claim 4, wherein the greedy search algorithm determines the greatest access speed based on at least a stripe size for the memory.

6. The method of claim 4, wherein the memory is a solid state drive (SSD), further comprising:
    compressing the set of second division arrays into a compressed data set such that a decompression time for the compressed data set is based on the second resolution size;
    wherein the storing is responsive to the compressing.

7. The method of claim 1, wherein storing the set of second division arrays includes storing the set of second division arrays at a plurality of storage locations, and the method further includes:
    retrieving the set of second division arrays from the plurality of storage locations as a single dataset.

8. A computing system for storing and accessing image data in a scalable format, the computing system comprising:
    one or more processors; and
    computer-readable media storing machine readable instructions that, when executed, cause the one or more processors to:
        generate an image data array representative of one or more images captured by one or more cameras;
        generate a set of first division arrays, each first division array representative of a different subset of the image data array and sharing a first resolution size;
        generate a set of second division arrays, each second division array representative of a different subset of one of the first division arrays in the set of first division arrays and sharing a second resolution size smaller than the first resolution size; and
        store, in a memory, the set of second division arrays such that the set of second division arrays is stored according to an order of the set of first division arrays.

9. The computing system of claim 8, wherein the machine readable instructions include instructions that, when executed, cause the one or more processors to further:
    generate an index map for each first division array of the set of first division arrays indicating a storage location for each second division array associated with a corresponding respective first division array.

10. The computing system of claim 8, wherein the first resolution size and the second resolution size are tunable by a user.

11. The computing system of claim 8, wherein the machine readable instructions include instructions that, when executed, cause the one or more processors to further:
    determine, using a greedy search algorithm, a first resolution size and a second resolution size for a greatest access speed.

12. The computing system of claim 11, wherein the greedy search algorithm determines the greatest access speed based on at least a stripe size for the memory.

13. The computing system of claim 11, wherein the memory is a solid state drive (SSD) and the machine readable instructions include instructions that, when executed, cause the one or more processors to further:

compress the set of second division arrays into a compressed data set such that a decompression time for the compressed data set is based on the second resolution size;

wherein the storing is responsive to the compressing.

14. The computing system of claim 8, wherein storing the set of second division arrays includes storing the set of second division arrays at a plurality of storage locations, and the machine readable instructions include instructions that, when executed, cause the one or more processors to further:

retrieve the set of second division arrays from the plurality of storage locations as a single dataset.

15. A tangible, non-transitory computer-readable medium storing instructions for storing and accessing image data in a scalable format that, when executed by one or more processors of a computing device, cause the computing device to:

generate an image data array representative of one or more images captured by one or more cameras;

generate a set of first division arrays, each first division array representative of a different subset of the image data array and sharing a first resolution size;

generate a set of second division arrays, each second division array representative of a different subset of one of the first division arrays in the set of first division arrays and sharing a second resolution size smaller than the first resolution size; and store, in a memory, the set of second division arrays such that the set of second division arrays is stored according to an order of the set of first division arrays.

16. The tangible, non-transitory computer-readable medium of claim 15, wherein the non-transitory computer-readable medium further includes instructions that, when executed by the one or more processors, cause the computing device to:

generating an index map for each first division array of the set of first division arrays indicating a storage location for each second division array associated with a corresponding respective first division array.

17. The tangible, non-transitory computer-readable medium of claim 15, wherein the first resolution size and the second resolution size are tunable by a user.

18. The tangible, non-transitory computer-readable medium of claim 15, wherein the non-transitory computer-readable medium further includes instructions that, when executed by the one or more processors, cause the computing device to:

determine, using a greedy search algorithm, a first resolution size and a second resolution size for a greatest access speed.

19. The tangible, non-transitory computer-readable medium of claim 18, wherein the greedy search algorithm determines the greatest access speed based on at least a stripe size for the memory.

20. The tangible, non-transitory computer-readable medium of claim 18, wherein the memory is a solid state drive (SSD) and the non-transitory computer-readable medium further includes instructions that, when executed by the one or more processors, cause the computing device to:

compress the set of second division arrays into a compressed data set such that a decompression time for the compressed data set is based on the second resolution size;

wherein the storing is responsive to the compressing.

\* \* \* \* \*